United States Patent Office 3,432,288
Patented Mar. 11, 1969

3,432,288
PROCESS CONTROL OF TOP-BLOWN OXYGEN CONVERTER
Victor P. Ardito, Lower Burrell, Harry L. Bishop, Pittsburgh, and Ray E. Woodcock, Tarentum, Pa., assignors to Allegheny Ludlum Steel Corporation, Brackenridge, Pa., a corporation of Pennsylvania
Filed June 29, 1966, Ser. No. 561,569
U.S. Cl. 75—60                                  9 Claims
Int. Cl. G01n 7/00; C22c 7/04

ABSTRACT OF THE DISCLOSURE

A method of and apparatus for measuring the percentage of the total volume of process oxygen remaining in the slag of a molten bath during a basic oxygen converter process, and using the measurement to control the overall oxygen balance during the process. The measurement is accomplished by subtracting from the total volume of oxygen entering the vessel through the lance, the oxygen content, in terms of volume, of solid particles escaping the vessel and, the volume of process oxygen escaping in the flue gas.

---

Figure 1:
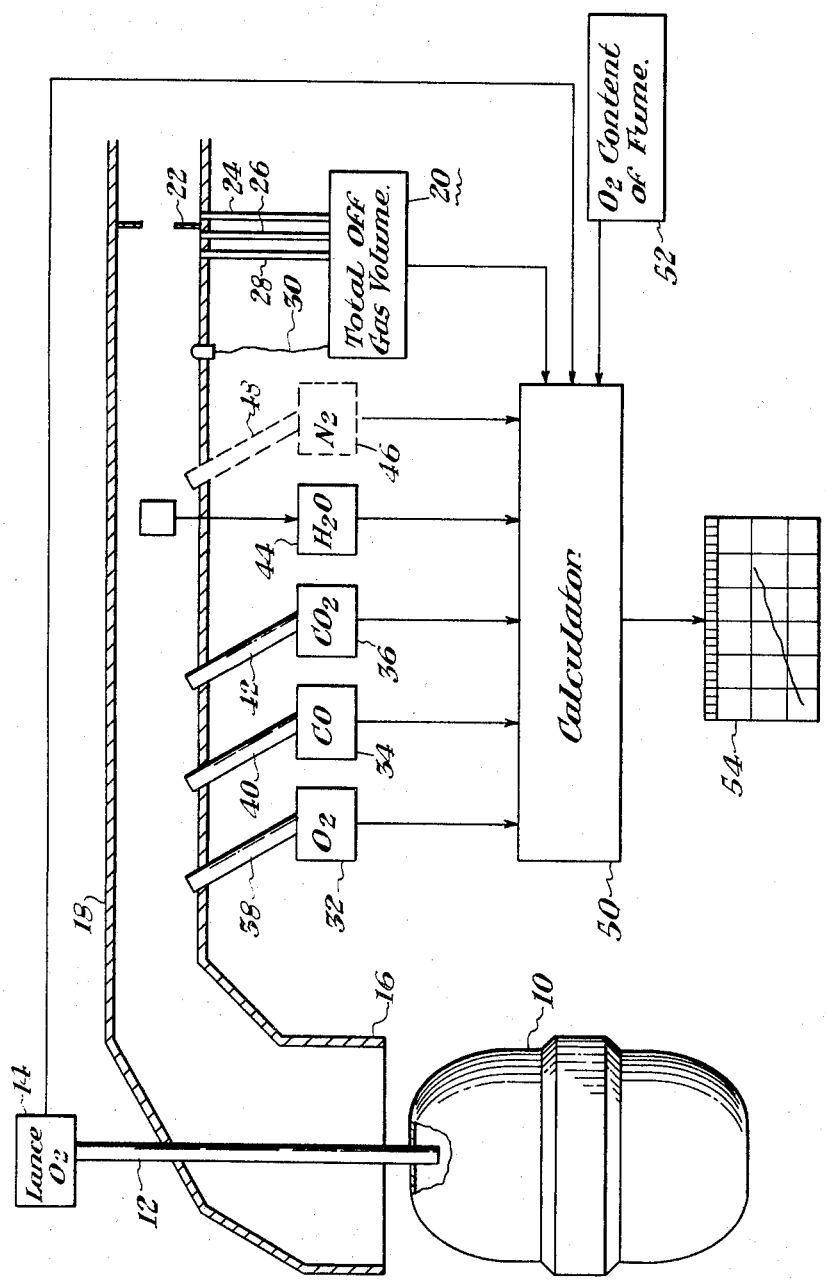

This invention relates to process control of a basic oxygen converter system, and more particularly to a system for determining at a given time the amount of oxygen in the slag formed in the vessel during the decarburizing process of blowing oxygen through a lance onto the surface of the metal bath.

In a basic oxygen converter system, the main source of oxygen into the system is from the process oxygen introduced into the vessel through the lance. During the decarburization process this process oxygen combines with the carbon in the molten bath to form carbon monoxide and carbon dioxide which escape from the mouth of the vessel. A portion of this process oxygen goes into the slag formed during the refining process, and a part of this oxygen may also escape as free gas.

Over the mouth of the vessel there is placed a hood which collects the escaping gases and directs the gas through an exhaust and dust cleaning system. Inasmuch as there exists a gap between the mouth of the vessel and the hood, air is introduced into the exhaust system by aspiration, the air assisting in the burning of the carbon monoxide to carbon dioxide in the exhaust system.

The process oxygen from the lance is partitioned in three ways. Firstly, it oxidizes a portion of the metal bath to form slag. Secondly, this oxygen forms oxygen containing off-gases which are exhausted from the mouth of the vessel. Thirdly, particles of iron oxide are formed and escape as fumes into the exhaust system.

In order to analyze the parameters which provide optimum blowing techniques regarding lance height, process oxygen flow rate and blow time, it is necessary to utilize a measurable quantity which bears a correlation to the variable which is desired to be controlled, i.e. carbon. Consequently, by continuously tracing the flow of oxygen into and out of the system, oxygen and iron losses can be minimized while providing a predictable system of computing the carbon content of the bath at any given time. A measure of iron and oxygen losses can be accomplished by measurement of the oxygen content of the slag formed on the metal bath.

It is accordingly an object of this invention to provide a new and improved method for predicting oxygen blow time.

It is another object of this invention to provide a new and improved method of determining the oxygen content of the slag formed in the metal bath at any given time.

It is a further object of this invention to provide a new and improved method of maintaining an overall oxygen balance in the basic oxygen converter system.

It is a still further object of this invention to provide a new and improved method of determining the oxygen content of the slag formed in the vessel containing the metal bath by measurement of the oxygen-containing gases in the total volume of gas leaving the vessel.

It is another object of this invention to proviode a new and improved method for continuously analyzing the oxygen-containing gas in the off-gases for continuously receiving an indication of the oxygen content of the slag formed in the vessel containing the molten bath.

It is still another object of this invention to provide a new and improved arrangement for carrying out said method.

The foregoing objects are accomplished by providing a method for obtaining an indication of the oxygen content of the slag in the metal bath during the decarburization process of blowing oxygen onto the surface of the metal bath comprising the steps of: determining the volume of oxygen due to air in the total volume of gas leaving the vessel; determining the volume of oxygen-containing gases in said total volume of gas leaving said vessel; determining the volume of oxygen due to process oxygen in said total volume of gas by subtracting the volume of oxygen due to air from the volume of oxygen in said oxygen-containing gases; determining the volume of oxygen in the fume leaving the vessel; determining the volume of oxygen introduced into the bath through the lance; determining the difference between said total volume of gas and the sum of the volume of oxygen in the fume and the volume of oxygen through the lance, the difference being in indication of the oxygen content in the slag of said metal bath.

Figure 2:
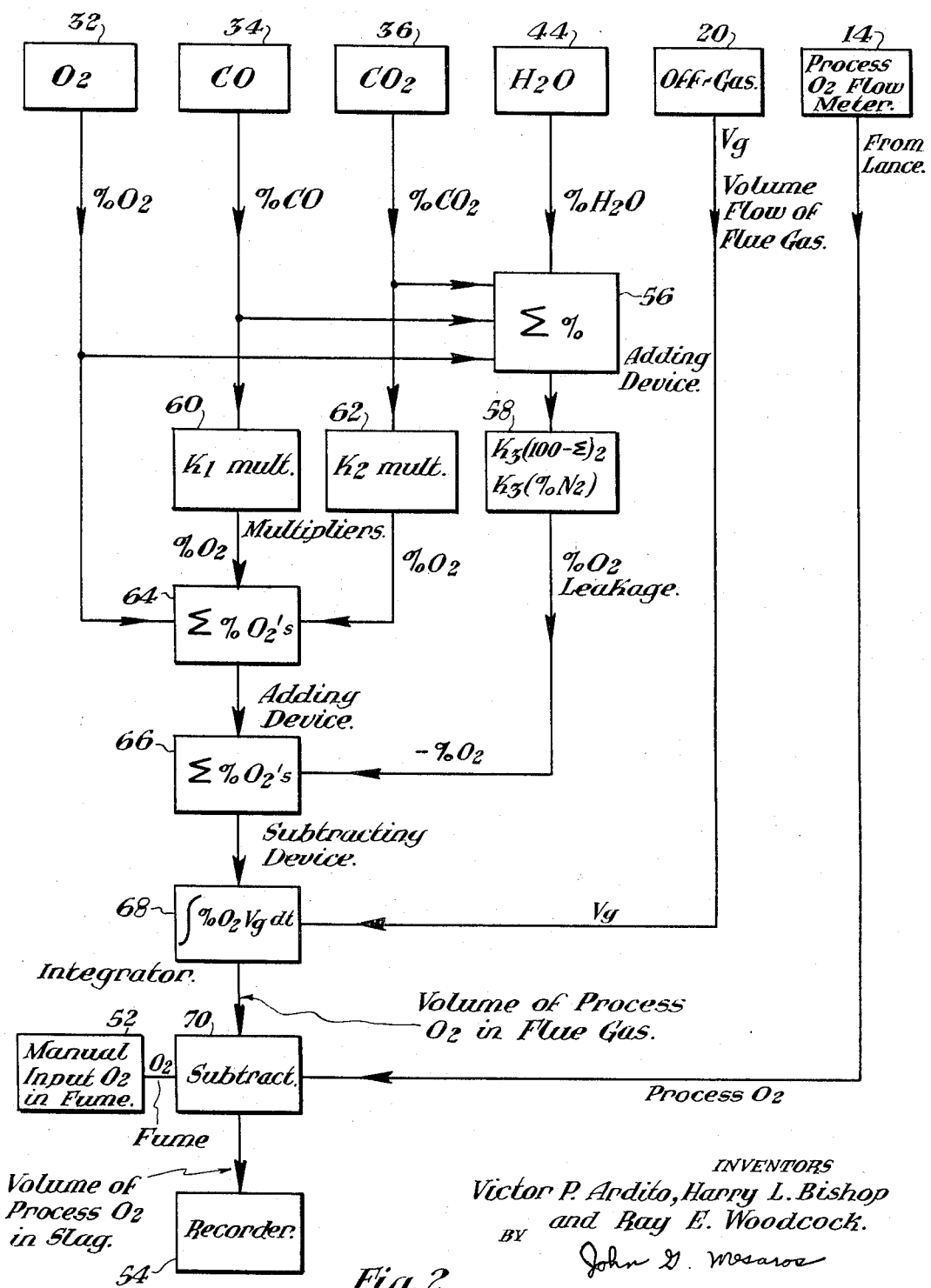

Other objects, features, and advantages of the invention will become obvious from the following description when read in connection with the accompanying drawings in which:

FIGURE 1 is a diagrammatic illustration of the basic oxygen vessel with means for collecting and analyzing the oxygen-containing off-gases, and FIG. 2 is a diagram illustrating the method according to the invention.

Referring now to FIG. 1, there is shown a basic oxygen furnace comprising the vessel 10 into which is inserted molten metal and scrap to be refined by the introduction of oxygen through a lance 12 onto the surface of the metal bath. The flow of oxygen through the lance 12 is measured by a flow meter 14, the purpose of which will become apparent.

In order to collect the off-gases during the decarburization process, a hood 16 is provided above and in close proximity to the mouth of the vessel 10. An exhaust stack 18 is connected to the upper end of the hood 16 for conducting the off-gases from the vessel 10 to a suitable off-gas cleaning system (not shown).

In order to measure the total volume of off-gases flowing through the exhaust stack 18, there is provided an off-gas flow meter generally designated as 20 which includes an orifice plate 22 through which the exhaust gas must flow, pressure differential measuring means 24 and 26 coacting with the interior of exhaust stack 18 on either side of orifice plate 22, a probe 28 for measuring the humidity and a temperature probe 30. The output of the off-gas flow meter 20 consists of a voltage proportional to the flow of the total volume of the off-gas in the exhaust stack 18.

Exhaust gas analyzers 32, 34 and 36 are provided to measure the percentage content $O_2$, $CO$, and $CO_2$, respectively, through ducts or tubes 38, 40 and 42, respectively, communicating with the interior of exhaust stack 18. The oxygen analyzer 32 can comprise for example a paramagnetic meter and a transmitter for providing an analog signal or a voltage proportional to the percentage content of oxygen in the total volume of gases leaving the vessel. The carbon monoxide analyzer 34 and the carbon dioxide analyzer 36 can be, for example, infrared analyzers and transmitters to provide analog values proportional to the percent content of CO and $CO_2$ respectively. Inasmuch as the total volume of the off-gas includes moisture, there is provided a fourth analyzer 44 to measure the moisture content of off-gases, the analyzer 44 being a dewcel for providing a signal proportional to the precentage content to moisture in the total volume of off-gas leaving the vessel. A fifth analyzer 46 is shown (in dotted lines) with its tube 48 for the measurement of the nitrogen content of the off-gas. The calculator 50 is provided to receive the analog signals from the oxygen flow meter 14, the oxygen analyzer 32, the carbon monoxide analyzer 34, the carbon dioxide analyzer 36, the moisture analyzer 44, the nitrogen analyzer 46 and the off-gas flow meter 20. An additional analog input is provided into the calculator 50 from input means 52 to give an indication of the oxygen content of solid particles escaping from the vessel 10, the solid particles being iron oxide or fume escaping into the exhaust system. The value presented into the input means 52 can be assumed on the basis of actual operating data, or it may be empirically determined by weighing the sludge or cleaned out dust in the dust cleaning system and determining the oxygen content per heat or ton by known relationships. The empirical data thus calculated can be programmed on a time basis for providing the analog input from input means 52. The calculator 50 is then programmed to utilize the analog inputs to arrive at an output proportional to the oxygen content of the slag in the metal bath at any given time and this output can be recorded on a strip chart recorder 54 to provide an indication for the operator.

The operation of the apparatus shown in FIG. 1 will be better understood as the description of the method proceeds with reference to FIG. 2.

The analyzers shown in FIG. 1 bear the same numerical designation in the diagrammatic illustration of the method in FIG. 2. There is shown an oxygen analyzer 32, a carbon monoxide analyzer 34, and a carbon dioxide analyzer 36, the outputs being voltages proportional to the percentage content of $O_2$, CO and $CO_2$, respectively, in the total volume of off-gas measured by flow meter 20. Similarly, the moisture analyzer 44, the off-gas analyzer 20, and the oxygen flow meter 14, produce outputs which are voltages.

In order to obtain the percentage content of oxygen due to air in the off-gas, it is necessary to either measure directly the nitrogen content of the off-gas and then determine the oxygen due to air by the known relationship of approximately 80% nitrogen to 20% oxygen for the total volume of air introduced into the system, or alternatively to calculate the nitrogen content by utilizing the outputs of the oxygen-containing gas analyzers 32, 34 and 36 in conjunction with the moisture analyzer 44.

In order to obtain the oxygen content due to air, the percentage contents of oxygen, carbon monoxide, and carbon dioxide from the analyzers 32, 34 and 36, respectively, are added together in adding device 56, and the total thereby obtained is added to the percentage moisture content as determined by moisture analyzer 44. Substracting the total thus determined from 100% will result in the percentage content of nitrogen in the off-gas. This step is carried out by subtracting device 58 whereupon the precentage content of nitrogen thus obtained is multiplied by constant $K_3$, the constant $K_3$ being determined by the relationship of nitrogen to oxygen in air. The result thus obtained provides an output proportional to the percentage content of oxygen due to air in the off-gas. In the event the off-gas is fully saturated with moisture, the measurement of moisture is not necessary and the oxygen due to air can be determined without this input.

Simultaneously therewith, the percentage content of carbon monoxide from analyzer 34 is multiplied by constant $K_1$ in multiplier 60 in order to determine the percentage content of oxygen in the carbon monoxide in the off-gas, the constant $K_1$ indicating the proportional relationship of carbon to oxygen in carbon monoxide. Similarly in multiplier 62 the percentage content of oxygen due to carbon dioxide is determined by a constant $K_2$ which is indicative of the proportional relationship of carbon to oxygen in carbon dioxide. The percentages of oxygen from the oxygen analyzer 32 and the multipliers 60 and 62 are added together in adding device 64. The percentage of oxygen due to air from subtracting device 58 is then subtracted from the ouput of adding device 64 in the substracting device 66. The output voltage of subtracting device 66 is proportional to the percentage content of oxygen in the total volume of off-gas due to the process oxygen introduced through the lane 12. The total volume of process oxygen is then continuously integrated in integrator 68 which integrates the product of the percentage content of process oxygen and the total volume of off-gas from meter 20. The output thus obtained continuously indicates the volume of process oxygen in the off-gas. A subtracting device 70 receives a voltage output from integrator 68, a voltage output from flow meter 14 proportional to the oxygen flow through the lance, and the voltage output of input means 52, the last mentioned voltage providing an indication of the oxygen content of the fume. The oxygen content of the fume as previously described may be empirically determined and programmed on a time basis for feeding to the subtracting device 70. In subtracting device 70, the outputs from input means 52 and flow meter 14 are added together and subtracted from the output of integrator 68. The result thus obtained will be a voltage proportional to the volume of process oxygen remaining in the slag of the molten bath. The volume is then fed to recorder 54 to give the operator a continuous indication of the oxygen content of the slag.

While there has been shown and described a specific embodiment of a method and apparatus for continuously determining the oxygen content of the slag formed in a molten bath, it is to be understood that it is not to be limited thereby inasmuch as other modifications and adaptations may be made within the scope of the invention.

We claim:
1. In a method of decarburizing a molten metal bath contained in a vessel wherein oxygen is supplied to the vessel through a lance and wherein the oxygen content of the slag is determined to establish the amount of oxygen supplied to said vessel, the improvement comprising measuring the amount of oxygen in said slag by the steps of:
   (a) measuring the amount of process oxygen through the lance into said vessel;
   (b) measuring the amount of off-gas leaving said vessel;
   (c) measuring the oxygen content of said off-gas and fume leaving said vessel;
   (d) measuring the oxygen due to air in said off-gas;
   (e) measuring the amount of oxygen in said off-gas due to process oxygen by subtracting from the oxygen content of said off-gas, the oxygen due to air in said off-gas;
   (f) measuring the difference between said amount of process oxygen in said off-gas and the sum of the amount of process oxygen through the lance and the oxygen content of said fume, the difference being an indication of the oxygen content of the slag in said vessel; and

(g) supplying oxygen to said vessel according to the oxygen content of the slag to control the overall oxygen balance during the decarburizing process.

2. In a method of decarburizing a molten metal bath contained in a vessel wherein oxygen is supplied to the vessel through a lance and wherein the oxygen content of the slag is determined to establish the amount of oxygen supplied to said vessel, the improvement comprising measuring the amount of oxygen in said slag by the steps of:
  (a) measuring the amount of off-gas leaving the vessel;
  (b) measuring the amount of oxygen due to air in said amount of off-gas;
  (c) measuring the amount of oxygen in oxygen-containing gases in said amount of off-gas;
  (d) measuring the amount of oxygen due to process oxygen in said amount of off-gas by subtracting the amount of oxygen due to air from the amount of oxygen in said oxygen-containing gases;
  (e) measuring the amount of oxygen in the fume leaving the vessel;
  (f) measuring the amount of process oxygen introduced into the vessel;
  (g) measuring the difference between said amount of process oxygen in said amount of off-gas and the sum of the amount of oxygen in the fume and the amount of process oxygen, the difference being an indication of the oxygen content of the slag in said vessel; and
  (h) supplying oxygen to said vessel according to the oxygen content of the slag to control the overall oxygen balance during the decarburizing process.

3. The method according to claim 2 wherein the oxygen-containing gases substantially comprise oxygen, carbon dioxide and carbon monoxide.

4. The method according to claim 2 wherein the amount of oxygen due to air is determined by first measuring the amount of nitrogen gas in said amount of off-gas and then measuring the amount of oxygen by the known relationship in air of oxygen gas to nitrogen gas.

5. In a method of decarburizing a molten metal bath contained in a vessel wherein oxygen is supplied to the vessel through a lance and wherein the oxygen content of the slag is determined to establish the amount of oxygen supplied to said vessel, the improvement comprising measuring the amount of oxygen in said slag by the steps of:
  (a) measuring the volume of off-gas leaving the vessel;
  (b) measuring the volume of process oxygen supplied through the lance;
  (c) measuring the percentage content of oxygen-containing gases in said volume of off-gas;
  (d) measuring the percentage content of nitrogen gas in said volume of off-gas;
  (e) measuring the percentage content of oxygen due to air in said volume of off-gas from the known relationship of nitrogen to oxygen in air by using the measured percentage of nitrogen;
  (f) measuring the percentage content of oxygen in said volume of off-gas from the measured percentage of oxygen-containing gases;
  (g) measuring the difference between the percentage content of oxygen due to said oxygen-containing gases and the percentage content of oxygen due to air, the difference being the percentage content of oxygen in said volume of off-gas due to process oxygen;
  (h) measuring by integration the volume of process oxygen in said volume of off-gas from the product of the percentage content of oxygen due to process oxygen and the volume of off-gas leaving the vessel;
  (i) measuring the volume of oxygen in the fume leaving the vessel;
  (j) measuring the difference between said total volume of process oxygen in said total volume of gas and the sum of the measured volume of oxygen through said lance and the measured volume of oxygen in the fume, the difference being an indication of the oxygen content in the slag in said vessel; and
  (k) supplying oxygen to said vessel according to the oxygen content of the slag to control the overall oxygen balance during the decarburizing process.

6. In a method of decarburizing a molten metal bath contained in a vessel wherein oxygen is supplied to the vessel through a lance and wherein the oxygen content of the slag is determined to establish the amount of oxygen supplied to said vessel, the improvement comprising measuring the amount of oxygen in said slag by the steps of:
  (a) measuring the total volume of gas leaving the vessel;
  (b) measuring the volume of process oxygen supplied through the lance;
  (c) measuring the percentage content of oxygen-containing gases in said total volume of gas leaving said vessel;
  (d) measuring the percentage content of moisture in said total volume of gas leaving said vessel;
  (e) measuring the percentage content of nitrogen gas in said total volume of gas leaving said vessel by summing the percentage content of moisture and the percentage content of oxygen-containing gases and subtracting said sum from 100 percent;
  (f) measuring the percentage content of oxygen due to air in said total volume of gas from the known relationship of nitrogen to oxygen in air by using the measured percent of nitrogen;
  (g) measuring the percentage content of oxygen in said total volume of gas from the measured percentage of oxygen-containing gases;
  (h) measuring the difference between the percentage content of oxygen due to said oxygen-containing gases and the percentage content of oxygen due to air, the difference being the percentage content of oxygen in said total volume of gas due to process oxygen;
  (i) measuring by integration, the total volume of process oxygen in said total volume of gas from the product of the percentage content of oxygen due to process oxygen and the total volume of gas leaving the vessel;
  (j) measuring the total volume of oxygen in the fume leaving the vessel;
  (k) measuring the difference between said total volume of process oxygen in said total volume of gas and the sum of the measured volume of oxygen through said lance and the measured volume of oxygen in the fume, the difference being an indication of the oxygen content of the slag in said vessel; and
  (l) supplying oxygen to said vessel according to the oxygen content of the slag to control the overall oxygen balance during the decarburizing process.

7. An arrangement for measuring the oxygen content of the slag of a metal bath in a vessel being supplied with process oxygen through a lance for decarburization, air being introduced by aspiration into the off-gas and fume leaving the vessel, said oxygen content being a measure of the efficiency of decarburization, said arrangement comprising:
  (a) first gas flow measuring means for measuring the amount of off-gas leaving the vessel;
  (b) analyzing means for measuring the content of free oxygen and oxygen in oxygen-containing gases of said off-gas;
  (c) means for measuring the nitrogen content of said off-gas;
  (d) other means utilizing the nitrogen content of said off-gas to measure the oxygen content of said off-gas due to air;
  (e) second gas flow measuring means for measuring the amount of process oxygen flowing through the lance;

(f) input means for deriving the oxygen content in the fume leaving said vessel;

(g) calculating means cooperating with said first and second gas flow measuring means, said analyzing means, said input means, and said other means for deriving from the measured amount of oxygen into and out of said vessel an indication of the amount of oxygen in the slag.

8. An arrangement according to claim 7 wherein said analyzing means include means for measuring the content of oxygen-containing gases of said off-gas and other calculating means cooperating with said means to derive the content of oxygen in said oxygen-containing gases by known relationships.

9. An arrangement according to claim 7 wherein said calculating means include integrating means for measuring the amount of process oxygen in said off-gas, said calculating means also including subtracting means for subtracting the sum of the measured flow of process oxygen through said lance and the desired oxygen content of the fume leaving the vessel from the measured amount of process oxygen in said off-gas.

References Cited
UNITED STATES PATENTS

| | | | |
|---|---|---|---|
| 2,977,217 | 3/1961 | Graef et al. | 75—60 |
| 3,100,699 | 8/1963 | Von Bogdandy et al. | 75—60 |
| 3,314,781 | 4/1967 | Johansson et al. | 75—60 |
| 3,329,495 | 7/1967 | Ohta et al. | 75—60 |

RICHARD O. DEAN, *Primary Examiner.*

U.S. Cl. X.R.

73—19, 23